Figure 2:
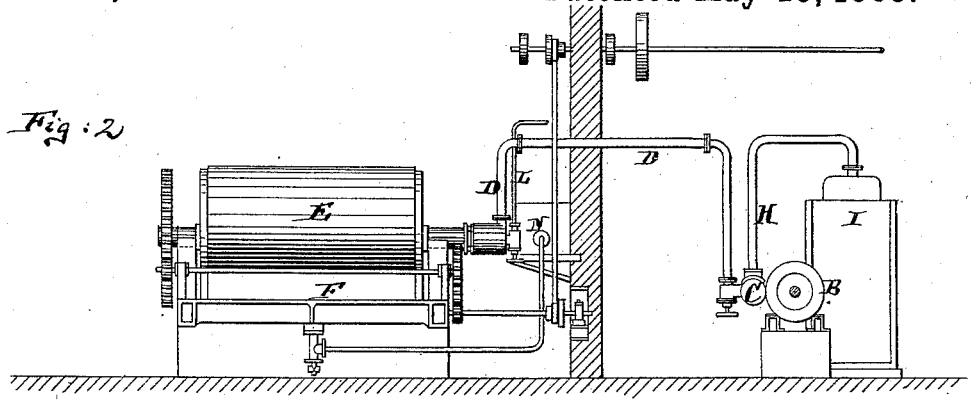

(No Model.) 6 Sheets—Sheet 1.

J. SIDDELEY & F. N. MACKAY.
APPARATUS FOR REFRIGERATING OILS, FATS, &c.

No. 277,797. Patented May 15, 1883.

Witnesses:
John C. Tunbridge
John M. Speer

Inventors:
John Siddeley
Fredk Noel Mackay
by their attorneys
Briesen & Betts (No Model.) 6 Sheets—Sheet 2.
J. SIDDELEY & F. N. MACKAY.
APPARATUS FOR REFRIGERATING OILS, FATS, &c.
No. 277,797. Patented May 15, 1883.
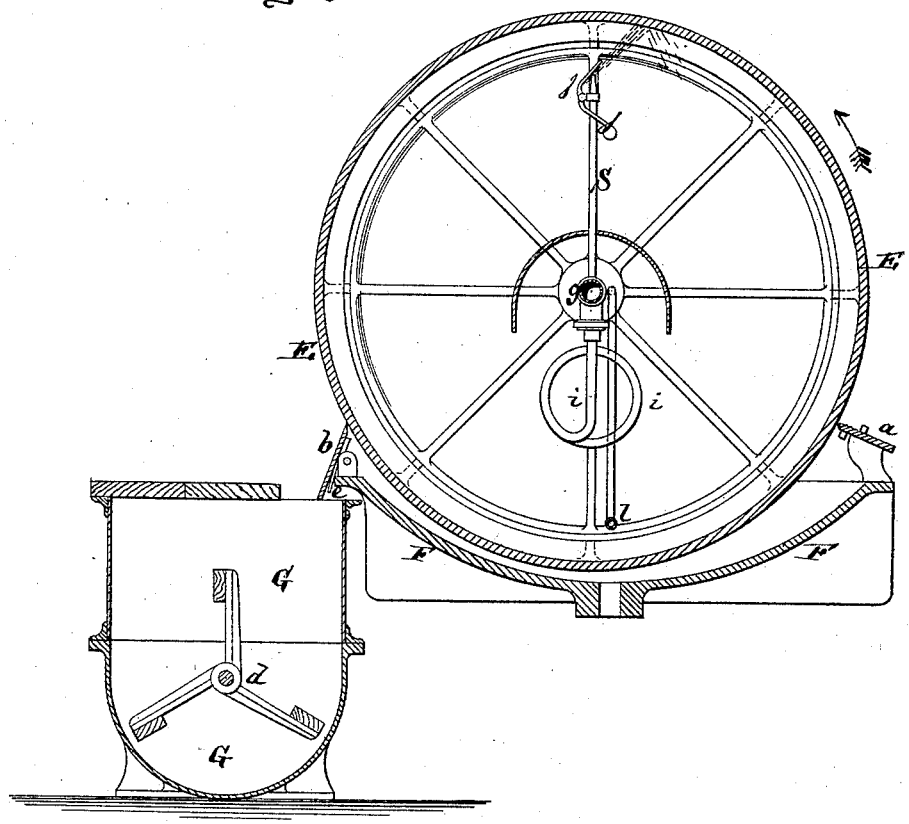
Witnesses
John C. Tunbridge.
John M. Speer.
Inventor:
John Siddeley
Fred'k Noel Mackay
by their attorneys
Briesen & Betts (No Model.) 6 Sheets—Sheet 3.
J. SIDDELEY & F. N. MACKAY.
APPARATUS FOR REFRIGERATING OILS, FATS, &c.
No. 277,797. Patented May 15, 1883.
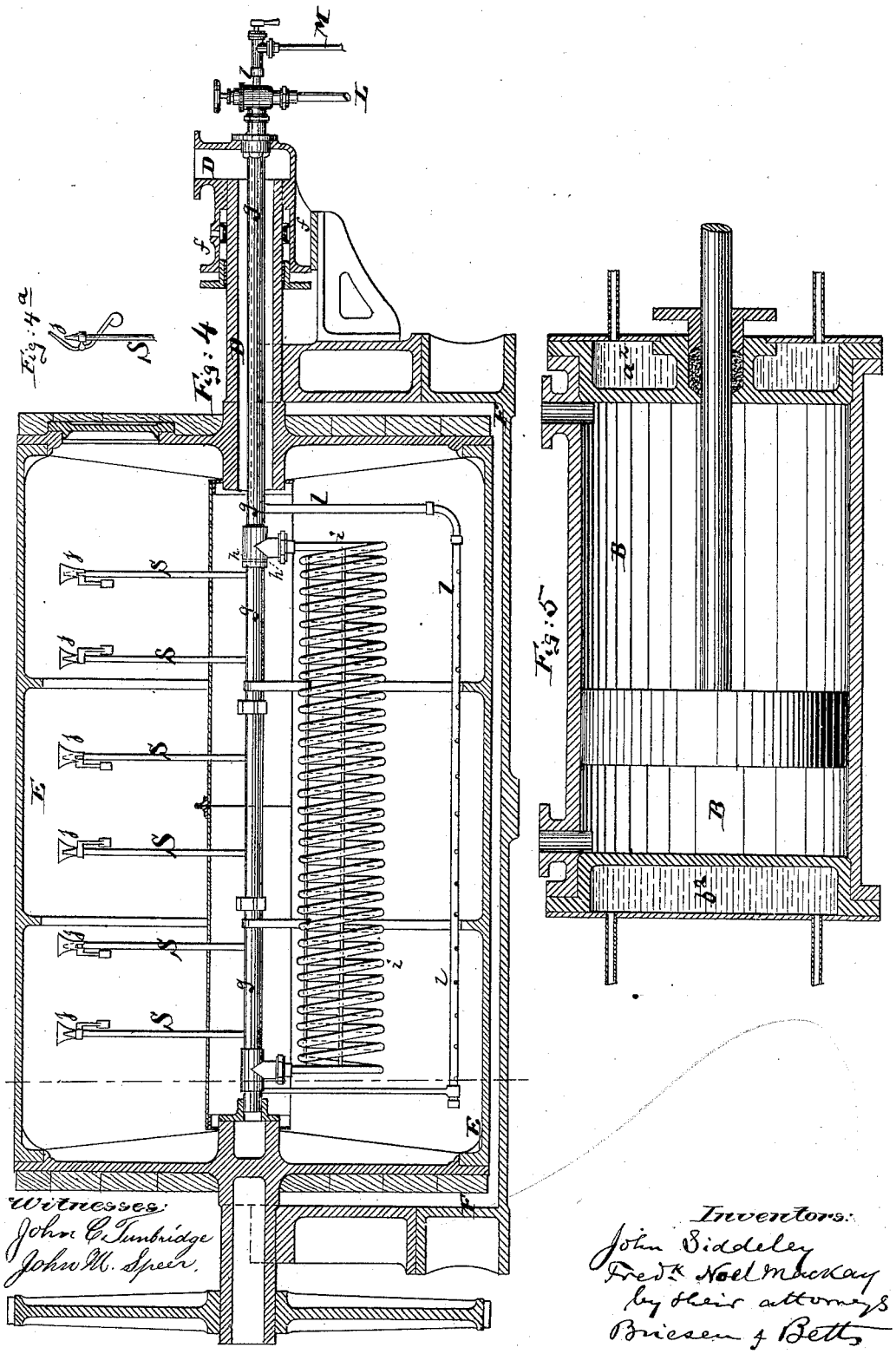

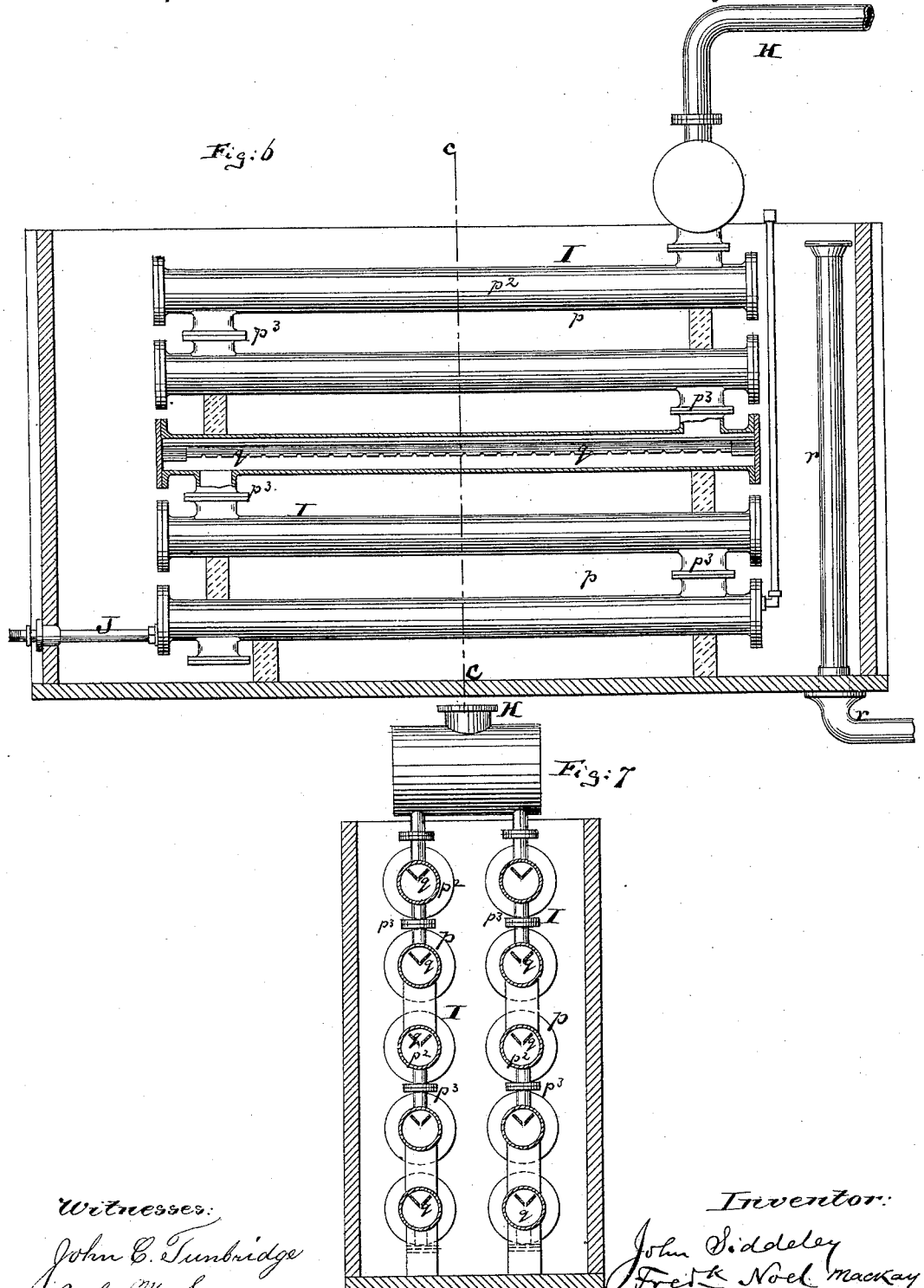

(No Model.) 6 Sheets—Sheet 5.
J. SIDDELEY & F. N. MACKAY.
APPARATUS FOR REFRIGERATING OILS, FATS, &c.
No. 277,797. Patented May 15, 1883.
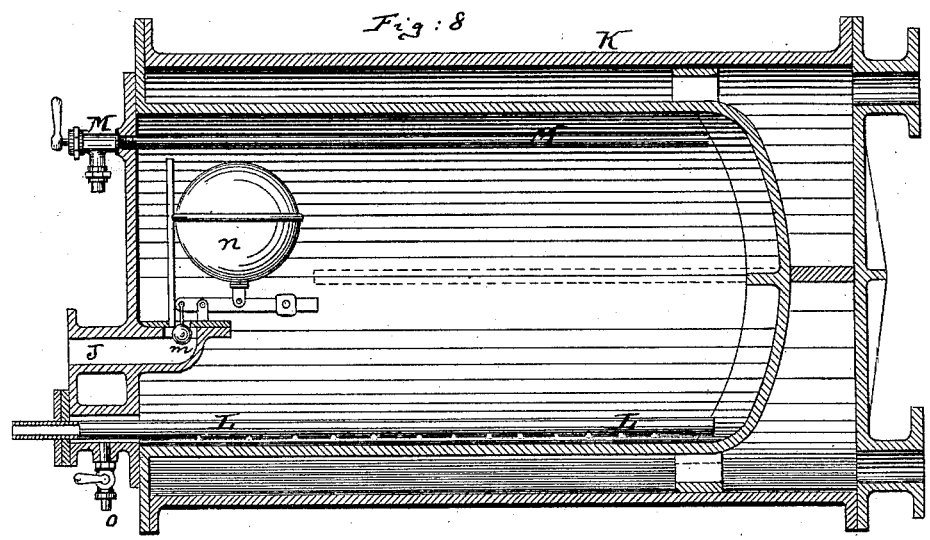
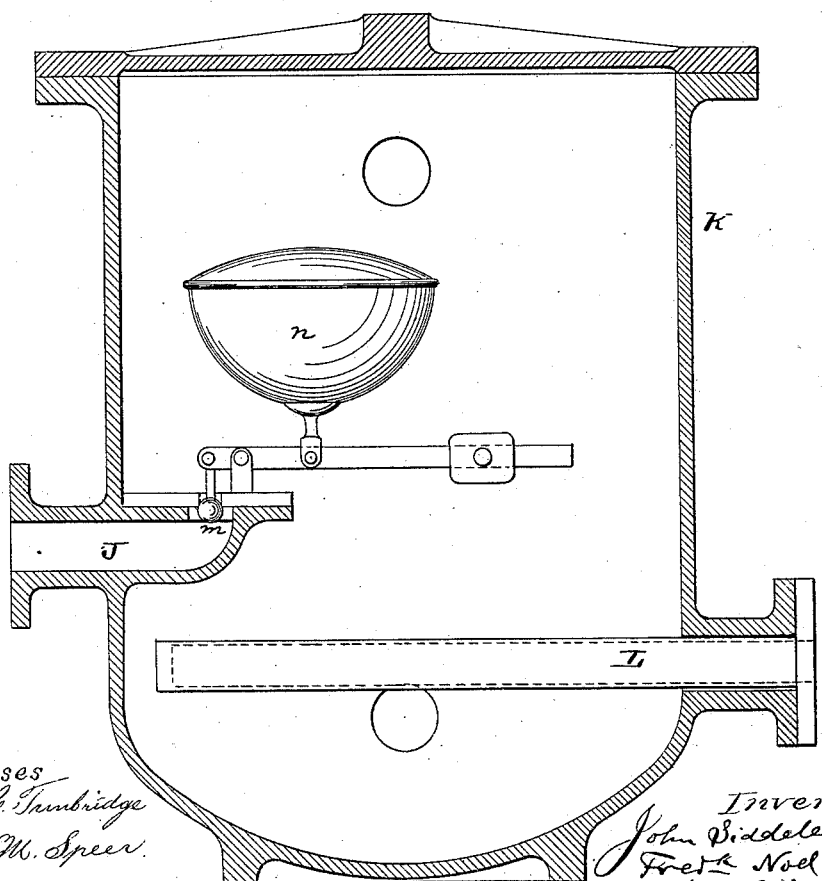

(No Model.) 6 Sheets—Sheet 6.
J. SIDDELEY & F. N. MACKAY.
APPARATUS FOR REFRIGERATING OILS, FATS, &c.
No. 277,797. Patented May 15, 1883.
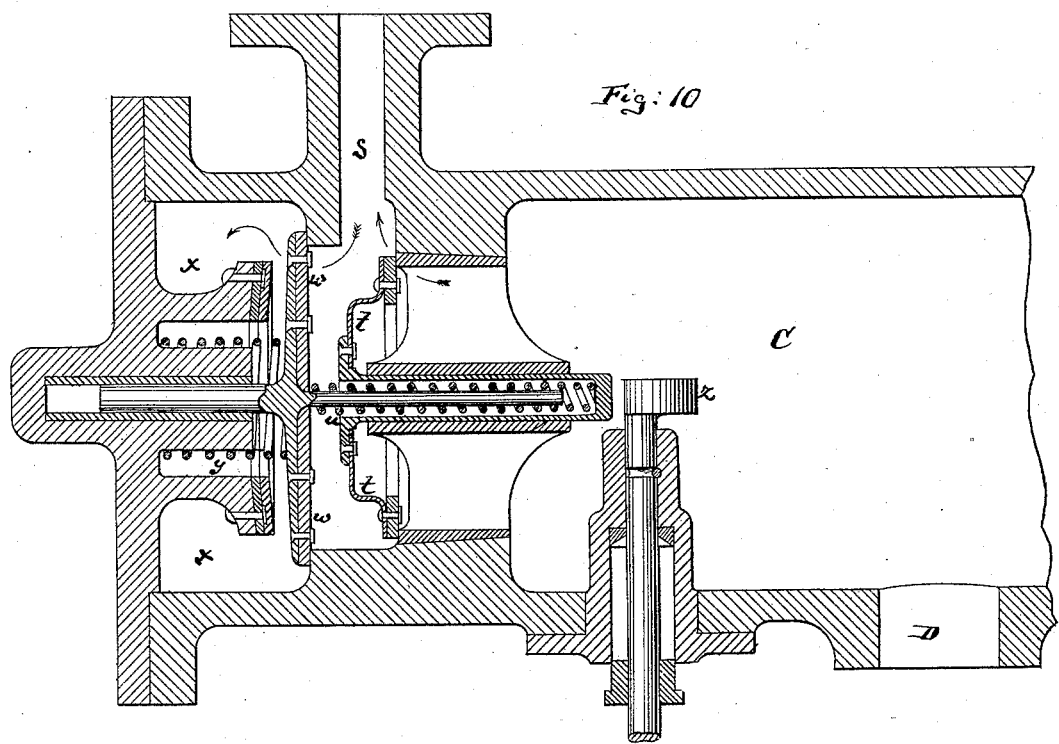
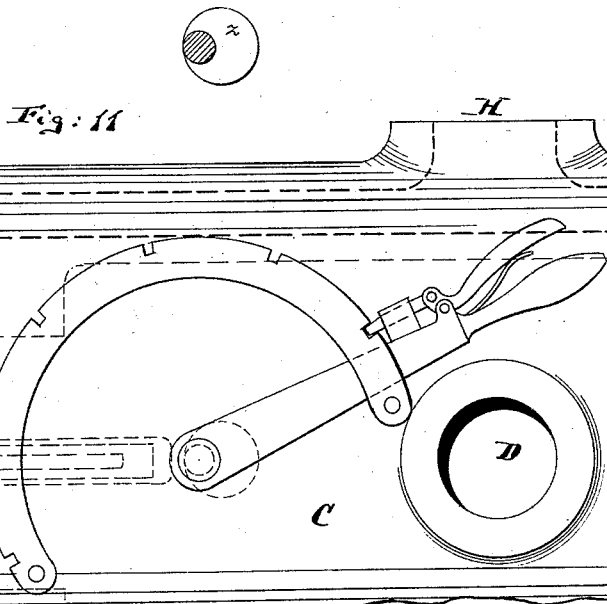

UNITED STATES PATENT OFFICE.

JOHN SIDDELEY AND FREDERICK N. MACKAY, OF LIVERPOOL, ENGLAND.

APPARATUS FOR REFRIGERATING OILS, FATS, &c.

SPECIFICATION forming part of Letters Patent No. 277,797, dated May 15, 1883.

Application filed November 15, 1882. (No model.)

*To all whom it may concern:*

Be it known that we, JOHN SIDDELEY and FREDERICK NOEL MACKAY, of Liverpool, England, have invented a new and Improved Apparatus for Refrigerating Oils, Fats, &c., of which the following is a specification.

This invention relates to a new machine for refrigerating oils, fats, &c., as a preliminary step to the extraction therefrom of the paraffine, anthracine, stearine, and other analogous substances.

To an extent the invention is based upon that described in English Patent No. 4,857 of 1877. In that machine is shown a metal drum so arranged that its outer surface revolves in a pan containing the oil, while its inner surface is kept cool by the refrigerating apparatus, whereby the oil which adheres to the revolving surface of the drum has its temperature reduced to the required degree, and in this congealed or crystallized condition is exposed to pressure to extract the liquid from its solid or crystallized parts, the latter furnishing paraffine, stearine, or other analogous article to be manufactured.

Our present improvement has reference, in the first place, to the application to said drum of certain scrapers or knives for removing the oil so frozen from the surface of the drum, which scrapers operate in combination with a certain adjustable gage, which regulates the quantity of oil taken up by the drum from the pan or reservoir.

The second feature of our invention has reference to the interior arrangement of the drum; and it consists in placing a cooling-worm into the drum for the reception of the return liquid spirit from the condenser or regulator of the refrigerating-machine, in which worm the return liquid spirit is cooled by the vapor in the drum previous to its coming in contact with the inner surface of the drum.

Our invention relates, further, to the arrangement of the discharge-nozzles within said drum, through which nozzles the cooling-liquid is ejected into contact with the interior surface of the drum; and it consists, in this connection, in applying certain spreaders to the nozzles, so that a spray of liquid is formed, and yet the hole through which the liquid is ejected is not contracted by the freezing of the liquid therein. These jet-pipes, throwing the freezing-liquid against the inner surface of the drum, are also one of the features of our invention, and are particularly effective upon that surface of the drum which is not dipped into the pan of oil, and which is contained between the above-mentioned gage and scraper. The drum is in connection with a vacuum-pump, which discharges the vapor drawn from the drum into a condenser, whence the liquid passes through a regulator, and from there goes back to the drum.

A further feature of our invention is the leading of a pipe from the regulator or condenser into the lower part of the drum, through which pipe any uncondensed gas which may have accumulated in the condenser may be passed into the liquid spirit that lies at the bottom of the drum.

We regard the application of the collector or regulator between the condenser and the drum as another important feature of our invention. Into this collector or regulator the condensed spirit may run, and from it said condensed spirit will pass to the drum. The collector also receives any water which the spirit may contain. It controls the action of the apparatus with the view toward preventing the pump from acting directly on the liquid contents of the condenser. In other words, the regulator is interposed between the condenser and the drum in which the vacuum is to be produced, so that the pump will not cause a vacuum to be produced in the condenser; and to this end the regulator has a self-acting float-valve, that interposes a definite barrier between the drum and condenser whenever the height of the liquid in the regulator is not sufficient to prevent the pump acting through it without said barrier. Thus the regulator prevents the suction from drawing uncondensed vapors into the drum.

Another feature of our invention has reference to the construction of the condenser, which is made with perforated troughs in its several conduits, so that the heavy spirits which become first condensed will in form of a spray from these troughs assist in condensing the vaporized spirits, and in thus reducing the working-pressure on the condenser and increasing the work done at each stroke of the vacuum-pump.

The invention further consists in a new construction of the vacuum-pump, as particularly applicable to the refrigerating apparatus; and it consists in so arranging the pump-valves that the suction and discharge valves are close to each end of the valve-chamber, and can both be removed by taking off one of the heads, which arrangement further reduces the space between the two valves and the piston of the pump when the same is at the end of its stroke, and allows of the use of but one port at each end of the pump for the double-acting vapor-pump, through which port the vapor coming to the pump enters and leaves, so that the temperature of the pump is kept more even than when separate ports are used.

Finally, our invention consists in the application of water-jackets to the heads of the vacuum-pump to inclose the stuffing-box with water and prevent the heating of said stuffing-box, at the same time removing heat that may be formed by compression at or near the ends of the pump.

Figure 1:
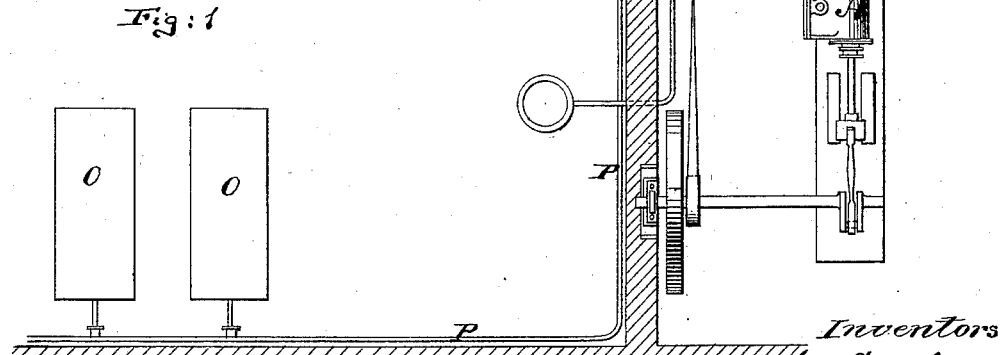

In the accompanying drawings, Figure 1 is a plan or top view of our improved apparatus, showing the general relative arrangement and disposition of the more important parts thereof. Fig. 2 is a side elevation thereof. Fig. 3 is a vertical cross-section of the refrigerating drum and pan into which it dips and of the vessel into which it discharges. Fig. 4 is a vertical longitudinal section of the said drum. Fig. 4$^a$ is a side elevation of jet-pipe and spreader. Fig. 5 is a detail longitudinal section of the pump-chamber, showing the water-jacketing at the heads of the pump. Fig. 6 is a side elevation, partly in section, of the condenser. Fig. 7 is a vertical cross-section of said condenser, taken on the plane of the line $c\ c$, Fig. 6. Fig. 8 is a vertical central longitudinal section of the regulator. Fig. 9 is a similar section of a modification of said regulator. Fig. 10 is a detail longitudinal central section of one end of the pump-valve box. Fig. 11 is a side view of the same.

With reference first to the general features shown in Figs. 1 and 2, the letter A therein represents the actuating steam-engine. B is the vacuum-pump; C, its valve-chest; D, the suction-pipe leading to the pump; E, the refrigerating-drum; F, the oil-tank into which the drum dips; G, the vessel into which the drum discharges the frozen oil; H, the discharge-pipe from the pump into the condenser I; J, the pipe from the condenser into the regulator K; L, the liquid-discharge pipe from the regulator to the drum E, and M the gas-discharge pipe from the regulator to the drum. N shows the pump for withdrawing the cooled contents from the receiver G and forcing them into the filter-presses O through pipe P. Q is a pump for feeding the oil into the tank F. The pump R is used for blowing through the filter-presses. The parts marked E, F, and G are more fully shown in Figs. 3 and 4, the condenser I in Figs. 6 and 7, the regulator K in Fig. 8, and the modification thereof in Fig. 9, the valve-chamber C in Figs. 10 and 11, and the pump-cylinder B in Fig. 5.

Now, with reference first to Figs. 3 and 4, it will be seen that the drum E, which hangs on suitable bearings, and which receives a slow rotary motion by suitable mechanism in the direction of the arrow shown in Fig. 3, dips into the tank F, that contains the oil, and is intended to carry a film of that oil during the said rotation. The outlet-opening for the discharge of sediments from the tank F is during operation plugged up by suitable cock or plug. The thickness of the film of oil taken up by the cooling-drum E is regulated by the adjustable gage $a$, which, when set nearer to the drum, renders the film thinner, but may be set to allow more oil to be taken up. The film of oil thus carried by the drum is frozen on its surface during said slow rotation, and is then taken off by the scraper $b$ and discharged into the vessel G, which contains a suitable agitator, $d$. This scraper $b$ is pressed against the periphery of the drum by a spring or springs, $e$, so as to keep absolute contact with the drum, but not cause undue friction. The pipe D leads into a box, $f$, in which one of the hollow trunnions of the drum E revolves, as shown in Fig. 4, so that the vacuum-pump will draw the vaporous contents out of the drum. Through the center of the drum E passes also a pipe, $g$, which connects with the pipe L, that comes from the regulator. The pipe $g$ has a partition, $h$, which divides its outer portion entirely from the inner portion. Outside of this partition $h$ the pipe $g$ connects with the worm $i$, which worm at its farther end connects with that part of the pipe $g$ that is inside of the partition $h$. On the pipe $g$ are also supported on the inner side of the partition $h$ discharge or jet pipes S S. These pipes S stand preferably vertically on the fixed pipe $g$, and have very minute discharge-openings at their upper ends for the escape of the liquid-cooling substance. These discharge-openings are near to fan-shaped spreaders $j$, that are pivoted to the discharge ends of the pipes S, and provided with weighted arms, as indicated in the detail Fig. 4$^a$, near Fig. 4, and also in Fig. 4. The liquid or spirit that enters the drum through the pipe L passes through the pipe $g$ into the worm $i$, thence into the inner part of the pipe $g$ up into the pipes S S. The suction created by the pump will cause the liquid to ascend in the pipes S, and to be thrown from said pipes in jets against the inner surface of the drum E, cooling the same on well-known principles. The spreaders cause the jets to be divided as finely as possible, thereby increasing the effect, and they also permit of the use of minute discharge-openings in the pipes S.

We have found that discharge-roses for the purpose of making jets or spreading the latter are objectionable, because liable to be clogged by the freezing of the liquid on them, and that the single little discharge-opening on each pipe S, when combined with the spreading fan-like blade $j$, will cause a more properly-divided current, and yet avoid the danger of freezing up, as stated. The pipes S discharge the freezing-mixture against that portion of the drum which is not dipped into the tank F, and which is between the gage $a$ and scraper $b$, as is more fully indicated in Fig. 3, so that the film of oil on the drum will feel the effect of the freezing-mixture between the said gage and said scraper. The worm $i$, being in the drum, will cause the liquid spirit from the regulator to become cooled by the contents of the drum previous to its coming in contact with the inner surface of the drum. The pipe M, from the upper part of the regulator K, leads also into the drum, connecting with a pipe, $l$, which passes centrally through the pipe $g$, and is then carried down within the drum into the lower part thereof, and perforated in its lower portion, as clearly shown in Fig. 4. Through these pipes M and $l$ the uncondensed gas is taken from the regulator should it accumulate therein, and carried through the holes of the pipe $l$ into the liquid spirit that lies at the bottom of the drum E, to be condensed by the same, if possible, or thoroughly cooled, at least.

The regulator K, which is more clearly shown in Fig. 8, receives the partly-condensed liquid or substance from the condenser I through the pipe J, and discharges the liquid again through the pipe L, (see Fig. 8,) which pipe L extends some distance into the body or chamber of the regulator, and is by preference perforated therein, as indicated. A valve, $m$, closes the inner orifice to the regulating-chamber K under the influence of a float, $n$, whenever said float is not raised by the liquid contents of the chamber K, so that thus, if there is not sufficient liquid in the regulator, the valve $m$ will be closed, and consequently the suction-pump acting through the drum E and pipe L will not be able to draw from the condenser if there is not enough liquid in the regulator; but if there is enough liquid in the regulator to cause the float to open the valve $m$, that column of liquid will suffice to seal the pipe J against such suction and in order to get this column more effective the modification of the regulator shown in Fig. 9 may be preferred, because there the regulator is shown in a vertical rather than horizontal position, producing thus a higher column of liquid, for the purpose of sealing the pipe that leads into it from the condenser. The regulator is jacketed with water, as shown in Fig. 8, and connected with a suitable gage, and may have the water circulation in connection with that surrounding the condenser; but this feature is not essential to the purposes of this invention. The pipe L, where it is contained within the regulator, is perforated at its lower portion and closed at its end, so that it will carry into the drum E only the liquid from the bottom of the regulator, and not be liable to take any gas with it. Whatever gas may accumulate in the regulator can pass away through the pipe M into the pipe $l$ of the drum, as already stated. The pipe M enters the upper part of the regulator, as shown in Fig. 8, to receive the accumulated gas from that portion thereof. Whatever water may settle at the bottom of the regulator from the spirits given at the beginning of the operation can be drawn off by the cock $o$. (Shown in Fig. 8.)

The condenser I (more fully shown in Figs. 6 and 7) receives the charges from the pump by the pipe H into two (more or less) systems of zigzag conduits, $p$—that is to say, each of these systems or conduits consists of a series of horizontal pipes, $p^2$, and vertically-alternating connections $p^3$. Within each horizontal portion $p^2$ is placed a perforated trough, $q$, having holes at its lower edge, so that whatever liquid may condense in any one of the pipes $p^2$ will flow into the trough $q$ and pipes $p^2$ next below, and will be discharged from said trough through the apertures thereof in minute drops or spray, so as thereby to assist in condensing the vaporous contents of the pipe within which said spray is caused to fall. Thus, by the arrangement of these troughs in the horizontal pipes of the condenser, the portions of the vapors that have already been condensed will be made to assist in condensing the remainder, thus economizing materially in the expense of producing proper condensation and increasing the work done at each stroke of the vacuum-pump.

The pipe $r$ (shown in Fig. 6) is the water-overflow pipe from the condenser.

The pump-valves, which are more clearly shown in Fig. 10, are also of peculiar arrangement.

In Fig. 10, C represents the valve-box and $s$ one of the ports leading from such valve-box into the pump-chamber. It is to be understood that the valve-box has two such ports, one leading into each of the ends of the pump-chamber proper. The suction-pipe D enters the valve-box between the two inlet-valves, of which one, $t$, is shown in Fig. 10. These inlet-valves $t$, under the influence of a spring, $u$, close the communication between the central part of the chamber C and the respective ports whenever the machines are at rest; but when the plunger of the pump creates suction in one of the ports by moving away from it the valve $t$ pertaining to that port will be drawn open, and the vapors from the drum will be drawn into the pump-chamber through the opening thus produced. When the stroke of the pump is afterward reversed the said open valve $t$ will be immediately closed, and at the same time the outlet-valve $w$, which normally separates the port $s$ from the end chamber, $x$, of the valve-box, will be pushed open, allowing the vapors to be passed into the said end chamber, $x$, from which they will pass into the pipe H through the passage indicated by dotted lines in Fig. 11. It will be perceived that the two valves $t$ and $w$, pertaining to a port, $s$, being placed near together and near the port $s$, can both be reached by opening one of the covers of the chamber C, and, moreover, by their arrangement, as shown, they allow the same port to be first an inlet and then an outlet port for the pump-chamber, thereby causing a certain evenness of temperature, which is impossible when one port is an inlet only and the other an outlet only, since the inlet will invariably be colder than the outlet port. The valve $w$ is normally closed against its seat by a spring, $y$.

$z$, Fig. 10, represents a cam or toe on a suitable arm placed near the stem or other portion of the suction-valve $t$, for the purpose of holding said valve $t$ open mechanically during any part of the operation. We find this to be desirable at the starting of the apparatus, so as to leave the pump practically out of operation at the beginning when the engine is first charged with rotating the drum, causing the vapor to accumulate therein. When the vapor has sufficiently accumulated in the drum the valves $t$ are no longer left under the influence of the cams $z$, but are given over to the alternate action of the pump-plunger for normal operation, as described.

The pump-chamber B, which is more fully shown in Fig. 5, has water-jacketed heads $a^2$ $b^2$, the head $a^2$ forming a chamber around the stuffing-box of the plunger-rod, preventing the same from becoming heated, and the head $b^2$ covering the other end of the pump-chamber. Not only does one of these water-jacketed heads prevent the stuffing-box becoming overheated, but both have the further object of removing whatever heat may be formed by compression at the ends of the pump, thus assisting in keeping the entire pump-chamber uniform in temperature.

The drum can also be used to work with ammonia, gasoline, ether, or any other volatile liquid now in use for producing cold.

We claim—

1. The combination of the freezing-drum E with the oil-supply tank F, adjustable gage $a$, spring-pressed scraper $b$, and receiving-vessel G, substantially as and for the purpose described.

2. The drum E, connected and combined with a vacuum-pump and provided with the worm $i$, which is in communication with the condenser and with the jet-pipes S within the drum, so that by said worm the liquid spirit from the condenser may become cooled, as specified.

3. The jet-pipe S, combined with the spreader $j$, substantially as described.

4. The drum E, combined with gage $a$, scraper $b$, oil-tank F, and with inner jet-pipes, S, that discharge against the part of the drum which is outside of the tank F and between the said scraper and said gage, substantially as specified.

5. The drum E, connected with the vacuum-pump and with the condenser, and provided with the jet-pipes S S, that are supported within the drum, substantially as specified.

6. The combination of the regulator K with the liquid-pipe L and gas-pipe M, and with the drum E and perforated pipe $l$, all arranged to allow uncondensed gas which may accumulate in the regulator to be passed into the liquid spirit lying at the bottom of the drum, substantially as described.

7. The regulator K, combined with the condenser I and pipe J, and with the drum E and pipe L, and provided with the valve $m$ and float $n$, to constitute an effective seal between the said drum and said condenser, substantially as specified.

8. The regulator K, combined with the discharge-pipe L, which leads into the bottom thereof, and which is perforated on its under side and closed at its inner end, substantially as described.

9. The regulator K, combined with the liquid-supply pipe J and liquid-discharge pipe L, and with the gas-discharge pipe M for connection with the drum E and condenser, substantially as specified.

10. In a condenser, the perforated trough $q$, placed into the horizontal pipe $p^2$ of said condenser, substantially as specified.

11. The valve-chamber C, having port $s$ at each end, combined with the suction-valve $t$ and discharge-valve $w$, both of which valves separate said port from opposite portions of the chamber C, substantially as described.

12. The double-acting pump having two discharge-valves and two suction-valves, and provided with only two ports, $s s$, that answer alternately as suction and discharge ports, substantially as described.

13. The valve-box C, made with end chambers, $x\ x$, and with two ports, $s\ s$, combined with the discharge-valves $w\ w$, which separate said ports from said end chambers, and with the suction-valves $t$, which separate said ports from the middle chamber of the valve-box, substantially as specified.

14. The cam or toe $z$, in combination with the inlet-valve $t$ of the pump for holding it open, substantially as described.

15. The pump-chamber B, provided with water-jacketed heads $a^2\ b^2$, substantially as specified.

JOHN SIDDELEY.
FREDK. N. MACKAY.

Witnesses:
JOHN HENRY WILLCOX,
JOSHUA SIDDELEY,
*Both of 14 Upper William Street, Liverpool.*